UNITED STATES PATENT OFFICE.

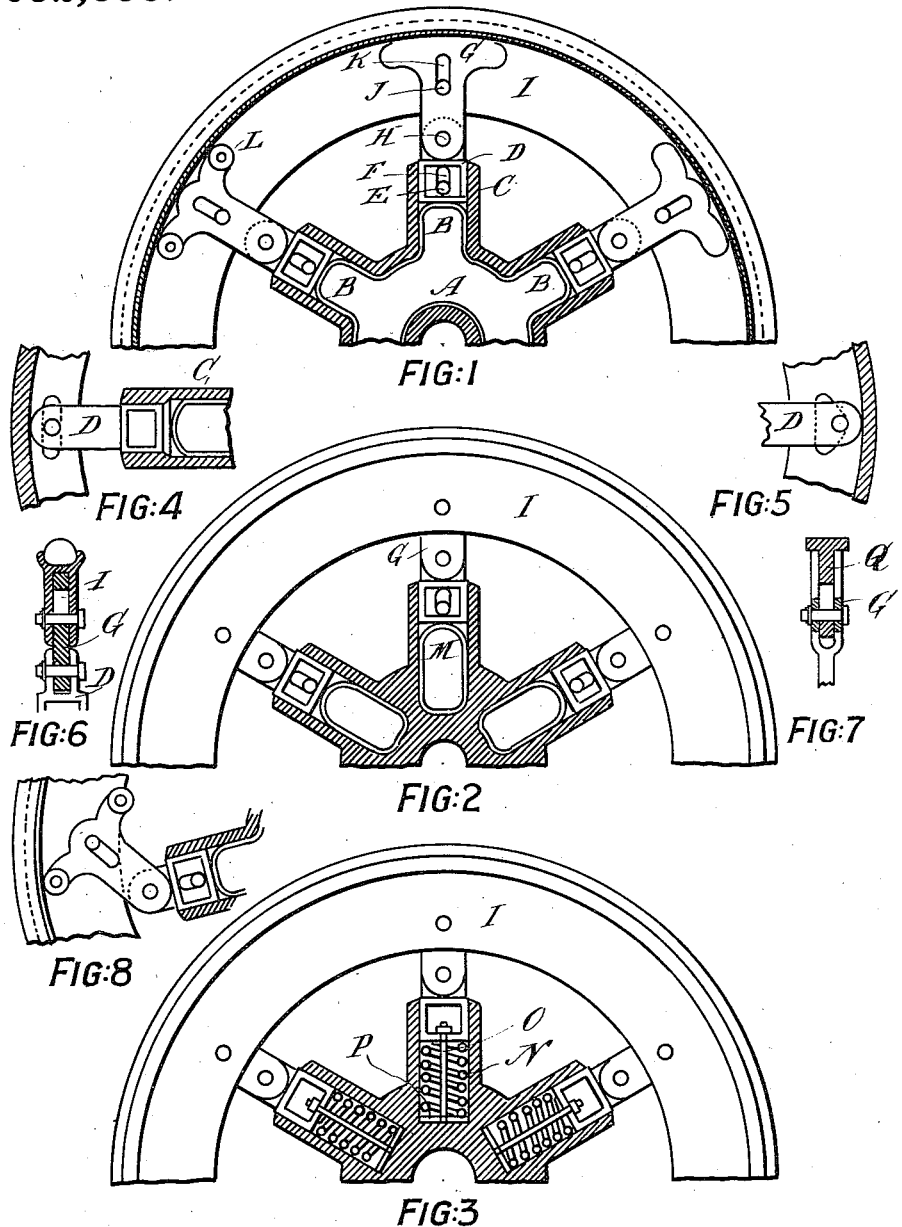

HENRY JAMES MARKS, OF TOOWOOMBA, QUEENSLAND, AUSTRALIA.

CUSHION-SPRING WHEEL.

1,052,358.  Specification of Letters Patent.  Patented Feb. 4, 1913.

Application filed July 30, 1912. Serial No. 712,291.

*To all whom it may concern:*

Be it known that I, HENRY JAMES MARKS, a subject of the King of the United Kingdom of Great Britain and Ireland, residing at Toowoomba, in the State of Queensland, Commonwealth of Australia, have invented certain new and useful Improvements in Cushion-Spring Wheels; and I do hereby declare the following to be a full, clear, and exact description of the invention, such as will enable others skilled in the art to which it appertains to make and use the same.

This invention relates to an improved cushion spring wheel, more particularly adapted for use with vehicles but also applicable to pulley wheels for driving machinery or other purposes.

The object of the invention is to dispense with the use of pneumatic tires, and their liability to puncture and substituting therefor cushion springs fitted within tubular spokes which will insure the same resiliency as pneumatic tires and where rubber cushions are employed will equally intercept the sound from the road to the vehicle.

The invention consists of constructing a wheel of tubular spokes, said spokes connected to the hub of the wheel by any suitable means and extended outward toward the rim of the wheel but terminating a short distance from the rim.

In the hub of the wheel concentric with the axle is a tubular ring which may be of metal or rubber or a composition of rubber and other material, to which are attached rubber tubes fitting inside the tubular spokes and extending to within about two-thirds of their length; to the tubular ring is fitted a valve whereby air can be pumped in and the tubes inflated.

Attached to the inside of the wheel rim by any suitable means are a number of preferably tubular plungers corresponding to the number of spokes in the wheel, the ends of which are preferably rounded and engage with the ends of the rubber tubes, forming a cushion spring. A slot is formed in the plungers and a hole in the tubular spokes through which are inserted pins for securing the plungers and spokes and limiting the travel of the plungers up and down the spokes.

The rim of the wheel may consist of any suitable material, such as wood or metal, or a combination of same and if necessary provided with a solid rubber tire.

To fully describe the invention, reference is now made to the drawings in which:—

Figure 1 is a sectional elevation of one half of resilient wheel. Figs. 2 and 3, part sectional elevation of same in modified form. Fig. 4, view showing head of plunger connected to flange on rim of wheel. Fig. 5, alternative method of connection. Figs. 6, sectional view showing double flange and connection to eccentric head. Fig. 7, sectional view showing single flange and connection to eccentric head. Fig. 8, view showing head working eccentrically.

"A" is a rubber ring fitted within the hub of the wheel and having branches "B" extending into tubular spokes "C" formed integral with the hub.

"D" are solid or tubular plungers with flat or rounded ends contacting with the rubber extensions "B" of the ring "A".

The plungers are connected to the tubular spokes by pins "E" working in slots "F" which may be formed either in the plungers or in the spokes, and which limit the travel of the plungers in the tubular spokes.

"G" are eccentric or lever heads connected to the plungers by pins "H" and to flange "I" or to bearings on the rims of the wheels, by pins "J" working in slots "K" in the eccentric heads, or vice versa; these heads may be provided with friction rollers "L" engaging with the rim of the wheels. Several patterns of these heads are shown in the drawings, either of which may be used. The pins "E" connecting the plungers to the tubular spokes, and the pins "J" connecting the eccentric or lever heads to the flange of the rim, may if necessary be fitted with friction rollers. The rubber ring "A" is fitted with a valve which projects through a hole in the hub whereby the ring and its branches may be inflated in the usual manner.

In the modified form shown in Fig. 2, I dispense with the rubber ring in the hub of the wheel and simply use rubber tubes or bags "M" inserted in the tubular spokes, each one of which is separate and independent and each fitted with a valve for inflating purposes. The advantage of this method is, that in the event of any escape of air, the leakage is confined to that particular spoke and a complete breakdown of the cushion support is prevented; but should all the cushion springs fail the wheel would run without cushion support and transport the vehicle to a destination.

In the modified form shown in Fig. 3, I substitute for the rubber cushions, spiral springs "N" freely laid in spokes or attached to plungers by pins "O" and washer plates "P," the plungers being connected to the wheels by similar means as in the previous methods.

The plungers in any or all of the methods shown may be directly connected to the wheel rim by pins and slots in the wheel rim as shown in Figs. 4 and 5, the free ends of the plungers pressing down upon the movable washer "P" which is stopped by a check or shoulder in the tubular spokes.

In adopting the method illustrated by Fig. 1, I may prefer to construct the hub and spokes of the wheel in two or more parts (for the easy insertion or removal of the rubber ring and its tubular branches) and join the parts together by any simple means, such as bolts and flanges.

In the drawings, Figs. 1 to 6 illustrate a wheel having a double flange and six-spokes. I would have it understood that I may employ a single flange and any number of spokes and that instead of either a double or single flange, brackets fixed to the rim for attaching thereto the eccentric heads.

In using a single flange as shown in Fig. 7 in which "Q" is the flange, I make the slot in the flange and form the eccentric head with a bifurcated end for attachment thereto by a pin as shown.

In using the invention, the pressure applied to the axle by the weight of the vehicle as the wheels revolve, causes the eccentric heads to move eccentrically from the rim of the wheel and to exert an inward pressure against the plungers which are forced against the cushion springs contained in the spokes, thus providing the necessary resiliency for easy and comfortable riding.

What I do claim as my invention, and desire to secure by Letters Patent is:—

1. In a wheel, a hub; tubular spokes radiating from said hub; cushioning means in the lower portion of said spokes; plungers working in said spokes above said cushioning means; means between said spokes and plungers for limiting the movement thereof in either direction; slotted heads pivotally connected to said plungers, a flanged rim; and positive driving connections on said rim engaging loosely through the slots in said heads.

2. In a wheel, a hub; tubular spokes radiating from said hub; a plunger working in each of said tubular spokes; cushioning means in said spokes adapted to be compressed by said plungers; pin and slot connections between said spokes and plungers for limiting the movement of the latter in either direction; heads having elongated slots therein pivotally connected to said plungers; a flanged rim; and pins carried by said rim and passing through the slots in said heads.

In testimony whereof, I have affixed my signature, in presence of two witnesses.

HENRY JAMES MARKS.

Witnesses:
E. MARTIN ABELL,
OLIVE K. ABELL.